(12) United States Patent
Maeda

(10) Patent No.: US 10,484,556 B2
(45) Date of Patent: Nov. 19, 2019

(54) METHOD OF DETECTING HOME POSITION, IMAGE READING DEVICE EMPLOYING THE METHOD, AND NON-TRANSITORY COMPUTER READABLE RECORDING MEDIUM THEREFOR

(71) Applicant: BROTHER KOGYO KABUSHIKI KAISHA, Nagoya, Aichi (JP)

(72) Inventor: Takashi Maeda, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/158,388

(22) Filed: Oct. 12, 2018

(65) Prior Publication Data

US 2019/0124224 A1 Apr. 25, 2019

(30) Foreign Application Priority Data

Oct. 20, 2017 (JP) ................................. 2017-203104

(51) Int. Cl.
*H04N 1/04* (2006.01)
*H04N 1/00* (2006.01)
*G06F 3/12* (2006.01)

(52) U.S. Cl.
CPC ....... *H04N 1/00702* (2013.01); *G06F 3/1211* (2013.01); *G06F 3/1259* (2013.01); *H04N 1/00037* (2013.01); *H04N 1/00551* (2013.01); *H04N 1/00689* (2013.01)

(58) Field of Classification Search
CPC ........... H04N 1/00702; H04N 1/00037; H04N 1/00551; H04N 1/00689; G06F 3/1211; G06F 3/1259

USPC ......... 358/448, 497, 496, 474; 399/211, 212
See application file for complete search history.

(56) References Cited

U.S. PATENT DOCUMENTS

| | | | | |
|---|---|---|---|---|
| 5,966,220 A | * | 10/1999 | Miyamoto | ........... H04N 1/0473 358/475 |
| 7,133,165 B2 | * | 11/2006 | Yamada | ............... H04N 1/0473 358/474 |
| 7,800,797 B2 | * | 9/2010 | Suzuki | ................. H04N 1/0473 358/406 |
| 9,979,845 B2 | * | 5/2018 | Maeda | ............... H04N 1/00551 |

(Continued)

FOREIGN PATENT DOCUMENTS

| | | |
|---|---|---|
| JP | 2004-252408 A | 9/2004 |
| JP | 2009-038654 A | 2/2009 |
| JP | 2016-51977 A | 4/2016 |

*Primary Examiner* — Cheukfan Lee
(74) *Attorney, Agent, or Firm* — Scully, Scott, Murphy & Preser, P.C.

(57) ABSTRACT

There is provided an image reading device which has an operation part configured to receive an operation to select one of a first scan function of treating image data of a plurality of originals read by a reader as one file and a second scan function of treating image data of one original read by the reader as one file. When the operation part receives the operation to select the second scan function, the reader is moved toward a waiting position opposite to the reading end position with respect to the reading start position after completion of the reading process. In response to detection of opening of the cover before the reader reaches the waiting position, a determining process is not executed, while the determining process is executed when opening of the cover is not detected before the reader reaches the waiting position.

10 Claims, 12 Drawing Sheets

(56) References Cited

U.S. PATENT DOCUMENTS

| | | | |
|---|---|---|---|
| 2004/0160648 A1 | 8/2004 | Ishizuka | |
| 2008/0074716 A1* | 3/2008 | Yoshihisa | H04N 1/00912 358/497 |
| 2009/0316233 A1* | 12/2009 | Inukai | H04N 1/0473 358/498 |
| 2017/0279979 A1* | 9/2017 | Maeda | H04N 1/00551 |
| 2019/0158679 A1* | 5/2019 | Nakajima | H04N 1/00037 |

* cited by examiner

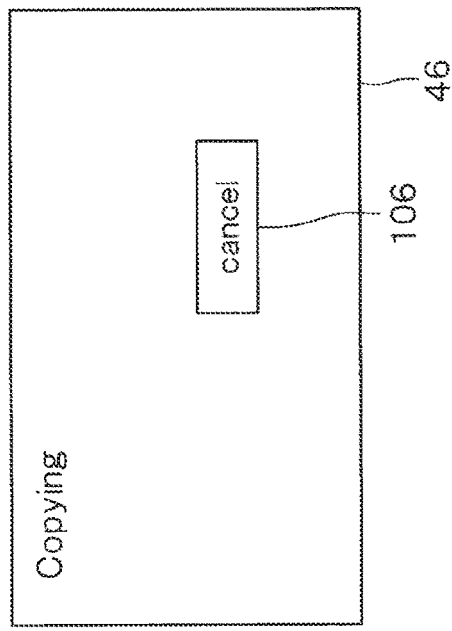
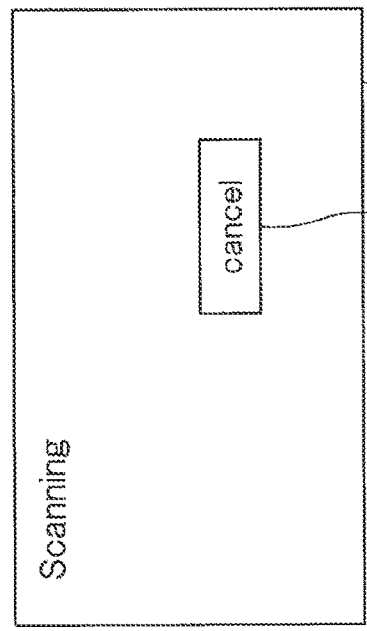

METHOD OF DETECTING HOME POSITION, IMAGE READING DEVICE EMPLOYING THE METHOD, AND NON-TRANSITORY COMPUTER READABLE RECORDING MEDIUM THEREFOR

CROSS-REFERENCE TO RELATED APPLICATIONS

This application claims priority under 35 U.S.C. § 119 from Japanese Patent Application No. 2017-203104 filed on Oct. 20, 2017. The entire subject matter of the application is incorporated herein by reference.

BACKGROUND

Technical Field

The present disclosures relate to a method of detecting a home position in an image reading device which is configured to read an image of an original, the image reading device, and a non-transitory computer readable recording medium storing instructions realizing the method.

Related Art

Conventionally, there has been known an image reading device configured to read an image on an original sheet in accordance with an FB (flatbed) type image reading method.

Such an image reading device typically includes an original platen, a cover configured to be openable and closable relative to the original platen, and a sensor unit below the original platen such that the sensor unit is reciprocally movable in a particular direction.

SUMMARY

When an image is to be read, the cover is opened and an original bearing the image is placed on the original platen. The cover is closed and start of an image reading operation is instructed, the sensor unit is moved, from a home position to an image reading end position, at a constant speed. When the sensor unit has been moved to the reading start position, reading of the original with use of the sensor unit is started. When the sensor unit reaches the reading end position, and reading of the original has been completed, the sensor unit is moved from the reading end position to the home position.

Between the home position and the reading start position, a pattern (e.g., a black-and-white pattern) for detecting a home position is arranged. A controller of such an image reading device may be configured to move the sensor unit from the home position toward the reading start position and detect whether the home position of the sensor unit is displaced from its regular position or not based on a moved distance of the sensor unit from the start position of the sensor unit until the black-and-white pattern is read by the sensor unit. If the above-described checking process of the home position is performed every time when one sheet of the original is read, it takes long time to read a plurality of sheets of the original.

According to aspects of the disclosures, there is provided an image reading device provided with an original platen configured to support an original, a cover configured to be open and close relative to the original platen, a detector configured to detect whether the cover is opened or closed, a reader configured to read the original supported on the original platen, a moving mechanism configured to move the reader along the original platen, an operation part configured to select one of a first scan function and a second scan function, the first scan function being a function of treating image data of a plurality of originals read by the reader as one file, the second scan function being a function of treating image data of one original read by the reader as one file and a controller. The controller is configured to execute a first moving process in which the controller controls the moving mechanism to move the reader from a reading start position to a reading end position for the reader reading the original supported on the original platen, a second moving process in which the controller controls the moving mechanism to move the reader toward a waiting position opposite to the reading end position with respect to the reading start position after the reader read the original, and a determining process in which the controller determines whether the waiting position coincides with a regular position when the reader reaches the waiting position. When the operation part receives an operation to select the first scan function, the controller repeatedly executes the first moving process and the second moving process without executing the determining process until image data for a plurality of originals treated as one file is obtained. Further, when the operation part receives an operation to select the second scan function, the controller executes the second moving process after execution of the first moving process, the controller not executing the determining process in response to detection of opening of the cover by the detector before the reader reaches the waiting position, the controller executing the determining process when opening of the cover is not detected by the detector before the reader reaches the waiting position.

According to aspects of the present disclosures, there is provided a method of controlling an image reading device having an original platen supporting an original, a cover configured to be open and close relative to the original platen, a detector configured to detect whether the cover is opened or closed, a reader configured to read the original supported on the original platen, an operation part. The method includes a receiving step of receiving selection information through the operation part, the selection information indicating a first function is selected or a second function is selected. When the receiving step receives the selection information indicating the first function, a reading step and a moving step are executed repeatedly until receiving an input information indicating completion of image data of a plurality of originals read by the reader as one file, the moving step including moving the reader to a reading end position from a reading start position and moving the reader toward a waiting position opposite to the reading end position with respect to the reading start position from the reading end position. When the receiving step receives the selection information indicating the second function, the reading step and the moving step are executed. The method further executes a determining step of determining whether the waiting position coincides with a regular position. The determining step does not determine until receiving the input information when the receiving step receives the selection information indicated the first information. Further, the determining step does not determine in response to detection of opening of the cover by the detector before the reader reaches the waiting position when the receiving step receives the selection information indicating the second function. Furthermore, the determining step determines when opening of the cover is not detected by the detector before the reader reaches the waiting position.

According to aspects of the present disclosures, there is provided a non-transitory computer readable recording medium for an image reading device having an original platen supporting an original, a cover configured to be open and close relative to the original platen, a detector configured to detect whether the cover is opened or closed, a reader configured to read the original supported on the original platen, an operation part and a controller. The recording medium contains instructions causing, when executed by the controller, the image reading device to execute a receiving process of receiving selection information through the operation part, the selection information indicating a first function is selected or a second function is selected. When the receiving process receives the selection information indicating the first function, a reading process and a moving process are executed repeatedly until receiving an input information indicating completion of image data of a plurality of originals read by the reader as one file, the moving process including moving the reader to a reading end position from a reading start position and moving the reader toward a waiting position opposite to the reading end position with respect to the reading start position from the reading end position. When the receiving process receives the selection information indicating the second function, the reading process and the moving process are executed. The instructions further causes, when executed by the controller, the image reading device to execute a determining process of determining whether the waiting position coincides with a regular position. The determining process does not determine until receiving the input information when the receiving process receives the selection information indicated the first information. Further, the determining process does not determine in response to detection of opening of the cover by the detector before the reader reaches the waiting position when the receiving process receives the selection information indicating the second function. Furthermore, the determining process determines when opening of the cover is not detected by the detector before the reader reaches the waiting position.

BRIEF DESCRIPTION OF THE ACCOMPANYING DRAWINGS

FIGS. 10A and 10B show examples of a job running state screen.

DESCRIPTION OF THE EMBODIMENT

<MFP>

Figure 1:
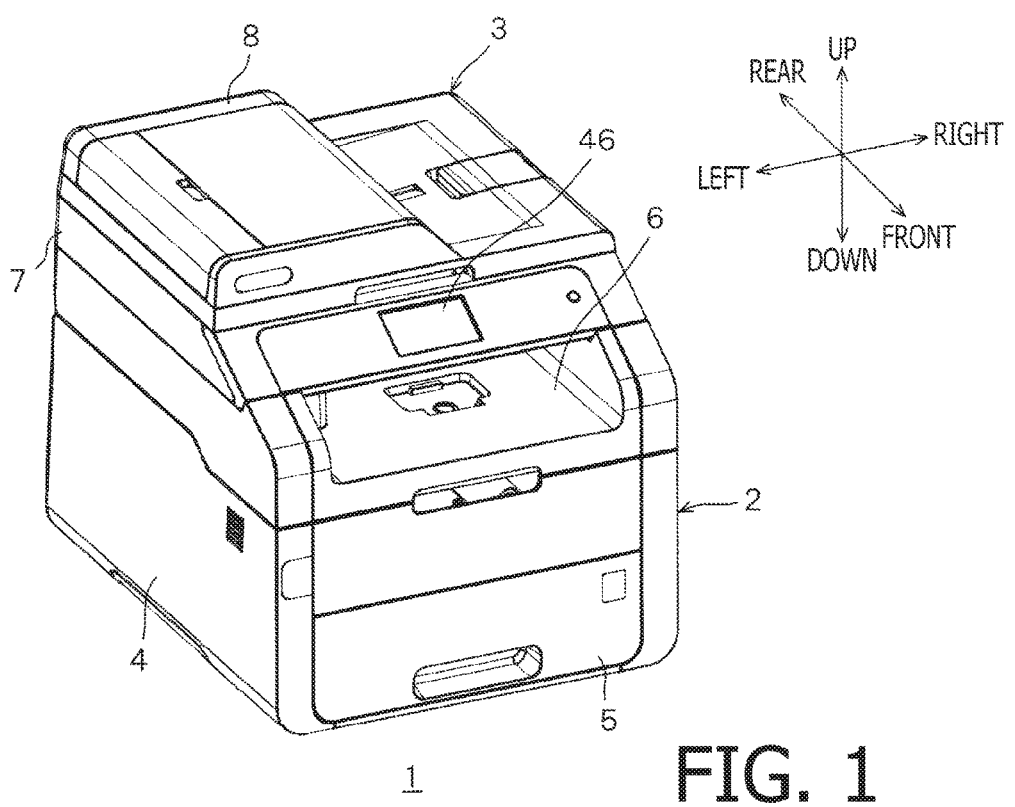
FIG. 1 is a perspective view of an MFP having an image reading device according to an illustrative embodiment of the present disclosures when an ADF is located as a closing position.
Figure 2:
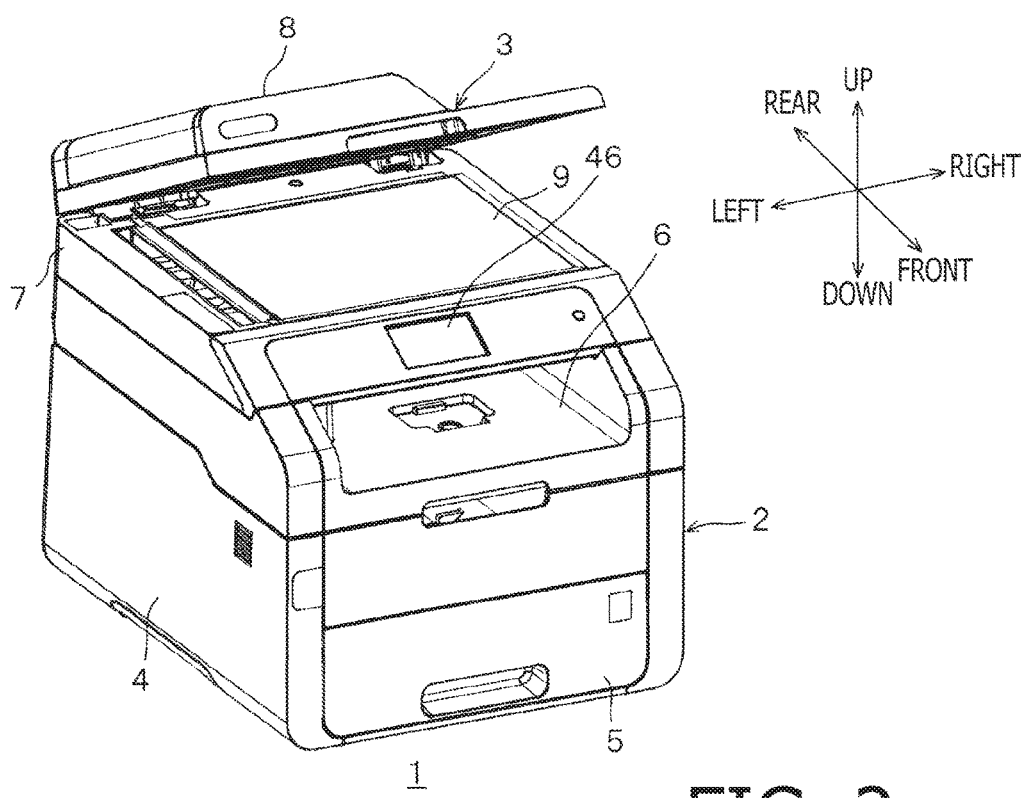
FIG. 2 is a perspective view of the MFP same as shown in FIG. 1 when the ADF is located as an opening position.

FIGS. 1 and 2 show an MFP (Multi-Function Peripheral) 1 according to an illustrative embodiment of the present disclosures. The MFP 1 is an electronic device having a plurality of functions such as a printing function, a scanning function, a copying function and the like. The printing function (which will also be referred to as an image forming function) is a function of printing an image, which is, for example, represented by image data, on a sheet such as a printing sheet. The scanning function (which will also be referred to as an image reading function) is a function of reading an image on an original sheet and generating image data representing the read image. The copying function is a function of reading an original with use of the scanning function, and printing the read image represented by the image data on a sheet with use of the printing (image forming) function. The MFP 1 is provided with an image forming device 2 having the printing function, an image reading device 3 having the image reading function.

The image forming device 2 has a printer housing 4 having a substantially rectangular parallelepiped shape. At a bottom portion of the printer housing 4, a sheet feed tray 5 is provided. The sheet feed tray 5 is configured to inserted in and removed from the printer housing 4 on one side thereof. The sheet feed tray 5 is configured to support a plurality of sheets (e.g., printing sheets) in a stacked manner For a purpose of referring to directions in the following description, the "one side" from which the sheet feed tray 5 can be inserted in and removed from will be defined as a front side of the casing, and an opposite side thereof will be referred to as a rear side (see FIGS. 1 and 2). The other directions are defined on the assumption that the MFP 1 is placed on a horizontal plane. Specifically, based on a state where the MFP 1 placed on the horizontal plane, an upside, a down side, a right side and a left side of the MFP 1 will be defined (see FIGS. 1 and 2).

When an image is to be formed on a sheet, the sheets accommodated in the sheet feed tray 5 are fed one by one into the printer housing 4. Then, the sheet fed from the sheet feed tray 5 is conveyed inside the printer housing 4 by a well-known sheet conveying mechanism. When the sheet is being conveyed inside the printer housing 4, an image (a color image or a monochromatic image) is formed on the sheet by a not-shown but well-known image forming section provided inside the printer housing 4. It is noted that an image forming method the image forming section employs may be an electrophotographic imaging method or an inkjet printing method. The sheet on which the image is formed is discharged from inside of the printer housing 4 onto a discharge tray 6 defined on an upper surface of the printer housing 4.

<Image Reading Device>

The image reading device 3 is arranged above the image forming device 2. The image reading device 3 has a scanner housing 7 and an ADF (Automatic Document Feeder) 8. On an upper surface of the scanner housing 7, a contact glass 9 (which is an example of an original platen) is provided. The ADF is configured to be located at a closing position and an opening position so as to be closable and openable relative to the scanner housing 7. Specifically, when the ADF 8 is located at the closing position, the contact glass 9 is covered with the ADF 8 as shown in FIG. 1. When the ADF 8 is located at the opening position, the contact glass 9 is exposed to outside as shown in FIG. 2. In other words, the ADF 8 serves as an openable and closable cover for the contact glass 9.

Figure 3:
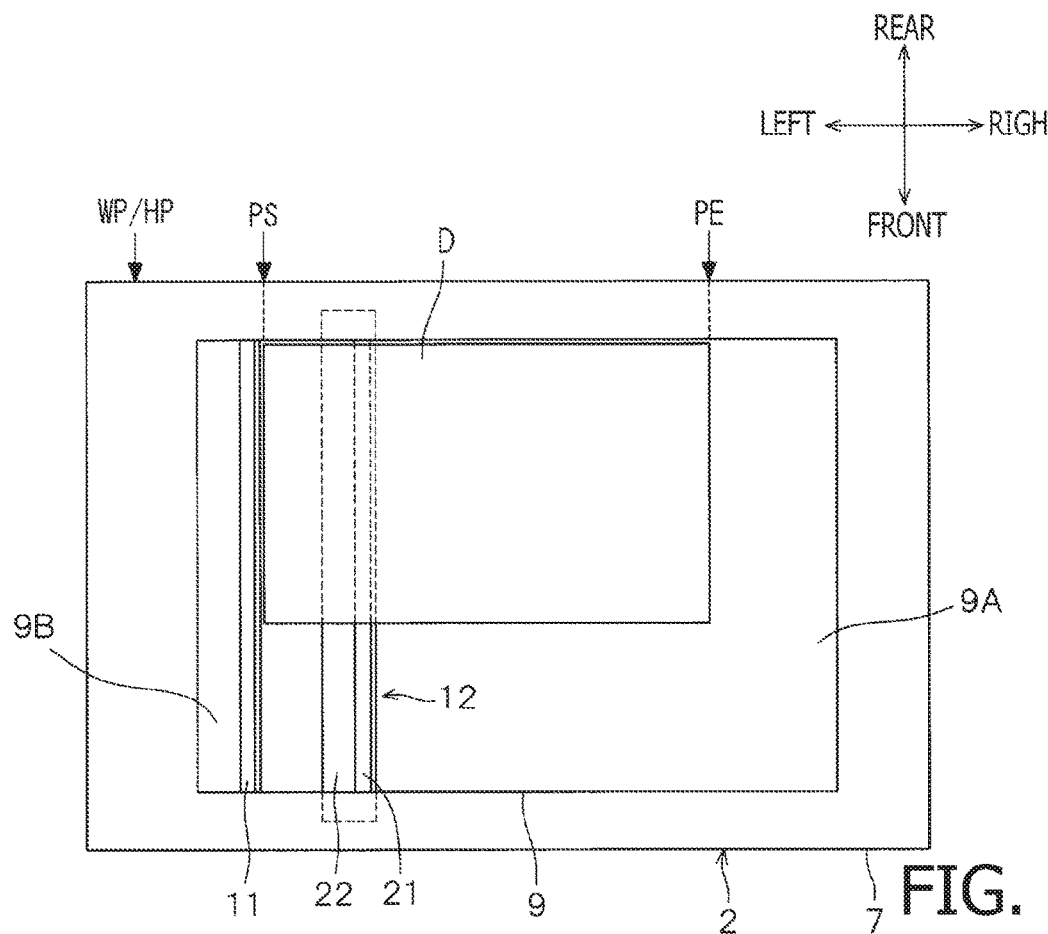
FIG. 3 is a schematic plan view of the image reading device according to the illustrative embodiment.
Figure 4:
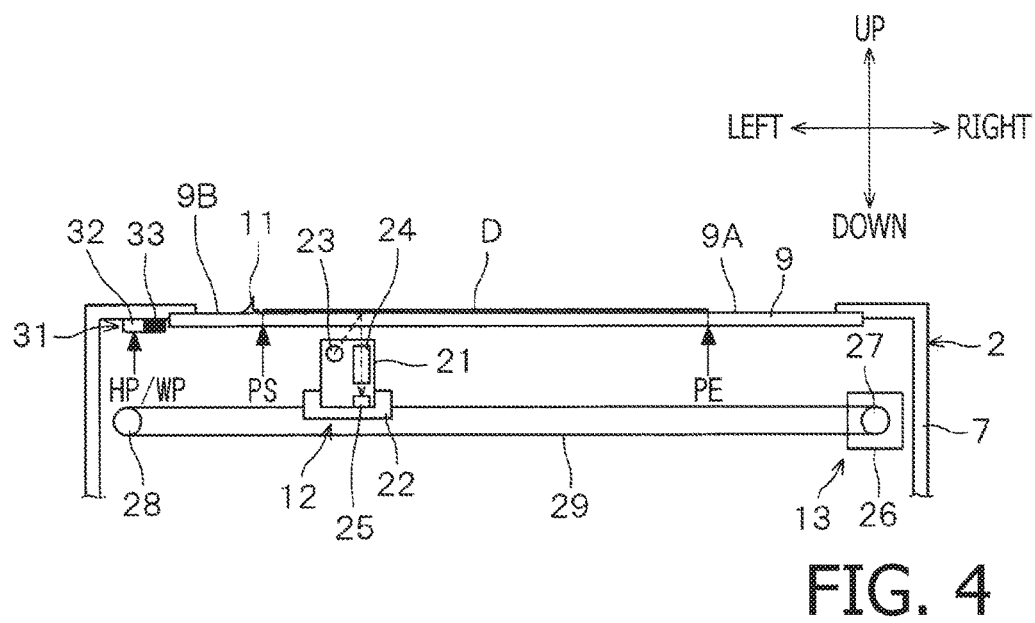
FIG. 4 is a schematic cross-sectional view of the image reading device according to the illustrative embodiment.

On a left end portion of the contact glass 9, a guide member 11 extending in the front-rear direction is provided at a position shifted rightward from a left edge of the contact glass 9 as shown in FIGS. 3 and 4. The guide member 11 has a planar surface extending both in the front-rear direction and in the right-left direction as its right end surface. Further, an upper surface of the guide member 11 is a part of a concave cylindrical surface having its central axis, which extends in the front-rear direction, located at an upper left position relative to the guide member 11. The image reading device 3 is configured to read an original D in accordance with an FB (flatbed) method and an ADF method. An right side area 9A on the upper surface of the contact glass 9 relative to the guide member 11 is an area configured to support the original D when reading of the original D in accordance with the FB method is performed. A left side are 9B on the upper surface of the contact glass 9 relative to the guide member 11 is an area though which the original D passes when reading of the original D in accordance with the ADF method is performed.

When reading of the original D in accordance with the FB method is performed, the ADF 8 is opened (i.e., the ADF 8 is located to the opening position), and the original D is placed on the area 9A defined on the upper surface of the contact glass 9. At this time, the original D is arranged such that the left edge thereof abuts against the right end surface of the guide member 11 and the rear edge thereof overlaps the rear edge of the area 9A. Thereafter, the ADF 8 is closed (i.e., located at the closing position), and a contacting surface of the original D with respect to the contact glass 9 is read in a state where the original D is covered by the ADF 8 from the above.

Figure 5:
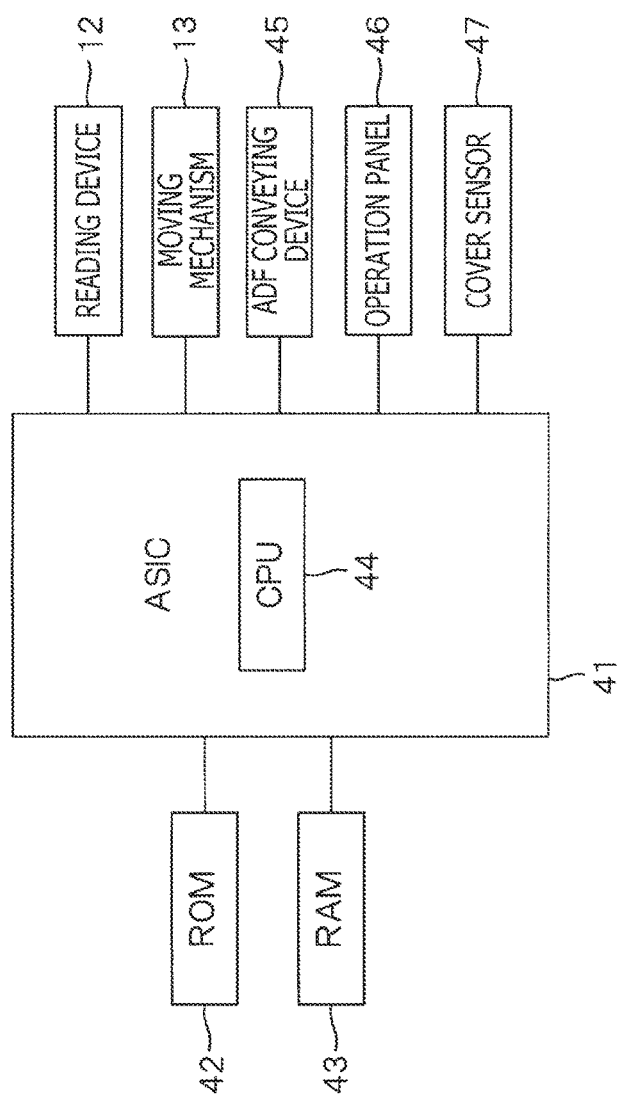
FIG. 5 is a block diagram illustrating an electrical configuration of the image reading device.

When the original D is read in accordance with the ADF method, the original D is placed at an original setting part of the ADF 8. It is noted that, when the original D is read in accordance with the ADF method, one or a plurality of sheets of original D could be placed at the original setting part at a time. By an ADF conveying device 45 (see FIG. 5) of the ADF 8 is configured to feed the original D on a sheet basis. Then, the sheet of original D passes through the area 9B defined on the upper surface of the contact glass 9 and is discharged onto an original discharging part of the ADF 8. When the original D passes on the contact glass 9, a contacting surface of the original D with respect to the contact glass 9 is read.

As shown in FIG. 4, a reading device 12 (which is an example of a reader) and a moving mechanism 13 are provided inside the scanner housing 7.

The reading device 12 includes a CIS (Contact Image Sensor) unit 21 and a carriage 22 mounting the CIS unit 21. The CIS unit 21 includes a light source 23, a rod lens array 24 and an image sensor 25. The image sensor 25 includes, for example, a linear image sensor configured such that a plurality of light receiving elements are arranged in the front-rear direction which is a main scanning direction.

When the original D placed on the contact glass 9 is read, the light source 23 emits light toward the contact glass 9. The light reflected by the original D placed on the contact glass 9 is incident on the rod lens array 24. The light incident on the rod lens array 24 is, by the function of the rod lens array 24, converged on the image sensor 25, thereby one line of image of the original D in the main scanning direction is read. The position of the image sensor 25 at this stage is an image reading position of the reading device 12.

The moving mechanism 13 is configured to move the reading device 12 in the right-left direction, which is a sub scanning direction perpendicular to the main scanning direction. the moving mechanism 13 includes a motor 26, a driving pulley 27, a driven pulley 27 and a belt 29. The motor 26 is a stepping motor configured to be rotated in a forward and a backward (i.e., a reversed) direction. The driving pulley 27 is driven by the motor 26 to rotate. The driving pulley 27 and the driven pulley 28 are paired such that the driven pulley 28 is rotated by a driving force of the driving pulley 27. The belt 29 is wound around the driving pulley 27 and the driven pulley 28. The driving pulley 27 is arranged at a right end part inside the scanner housing 7 such that a rotation axis thereof extends in the front-rear direction. The driven pulley 28 is arranged at a left end part inside the scanner housing 7 such that a rotation axis thereof extends in the front-rear direction at a position of which height is the same as that of the rotation axis of the driving pulley 27. The carriage 22 is secured to the belt 29. As the driving pulley 27 is rotated by the motor 27, the belt 29 runs. As the belt 27 runs, the carriage 22 secured to the belt 22 moves in the sub scanning direction.

On the left side with respect to the contact glass 9, an adjustment reference plate 31 is arranged. The adjustment reference plate 31 has a white area 32 and a black area 33 which are arranged in the sub scanning direction. A position spaced leftward from a boundary of the white area 32 and the black area 33 by a particular fixed amount is a home position HP of the reading device 12.

As starting points or end points in regard with movement of the reading device 12, a standby position WP, a reading start position PS, a reading end position PE and an ADF reading position PA are defined.

The waiting position WP is a position serves as a reference to the position of the reading device 12. When the waiting position WP is not displaced from its regular position, the waiting position WP and the home position HP coincide with each other.

It is noted that the position of the reading device 12 is a position at which the reading device 12 reads an image. For example, when it is said that the reading device 12 is located at the waiting position WP, it means that the reading position of the reading device 12 coincides with the waiting position WP.

The reading start position PS is designed to be located at the right edge position of the guide member 11. In order to eliminate possibility that the reading device 12 reads the guide member 11, the reading start position PS may be defined at a position spaced rightward relative to the right edge of the guide member 11.

The reading end position PE is set based on the size of the original D, and is set to a position spaced rightward from the reading start position PS by a distance corresponding to the length of the original D in the sub scanning direction.

It is noted that the ADF reading position PA is set at a central part, in the right-left direction, within the area 9B on the upper surface of the contact glass 9.

<Electrical Configuration of Image Reading Device>

The image reading device 3 includes an ASIC (application specific integrated circuit) 41, a ROM (read only memory) 42 and a RAM (random access memory) 43.

The ASIC 41 includes a CPU 44 (which is an example of a controller). The CPU 44 executes various programs for various processes based on information input to the ASIC 41, and controls respected parts of the image reading device 3. The respective parts to be controlled include the moving mechanism 13, the ADF conveying device 45 (which is an example of an original supplier), and the operation panel 46.

As shown in FIGS. 1 and 2, the operation panel 46 is arranged on a front surface of the scanner housing 7. The operation panel 46 includes a touch panel configured such that an operation part is overlaid on a display part. Specifically, the display part includes an LCD (liquid crystal display). Further, the operation part includes a pressure sensitive type or electrostatic capacitance type transparent film switch.

Various pieces of information and/or images such as operation buttons are displayed on the operation panel 46. When a user touches (operates) any of the operation buttons displayed on the operation panel 46, an instruction corresponding to the touched (operated) operation button is received by the operation panel 46. When the instruction is received by the operation panel 46, a signal or data corresponding to the instruction is transmitted from the operation panel 46 to the ASIC 41.

The ROM 42 includes a rewritable non-volatile memory such as a flash memory. The ROM 42 stores programs to be executed by the CPU 44 and various pieces of data. The ROM 42 further stores a standard original size table in which data indicating lengths of shorter and longer sides are registered for respective standard original sizes as well as programs for controlling various components of the MFP 1. For example, the lengths of the shorter side and the longer side of an A4 size sheet is 210 mm and 297 mm, respectively. The ROM 42 also stores the number of driving steps of the motor 26 to move the reading device 12 from the home position HP to the reading start position PS, and the number of driving steps of the motor 26 to move the reading device 12 from the home position HP to the ADF reading position PA.

The RAM 43 includes a volatile memory such as a DRAM (dynamic random access memory), and mainly used as a work area when the CPU 44 executes various programs. Further, the RAM 43 constitutes a counter, and a step number counter is configured to increment the counter by one when the motor 26 is driven by one step. The CPU 44 controls driving of the motor 26 based on the number of steps counted by the step number counter, thereby a position of the reading device 12 being controlled.

Further, signals necessary to control respective components of the image reading device 3 are input to the ASIC 41. For example, the image reading device 3 is provided with a cover sensor 47 (which is an example of a detector) configured to output a detection signal having different levels depending on whether the ADF 8 is located at the opening position or the closing position, and the detection signal of the cover sensor 47 is input to the ASIC 41. Further, the image reading device 3 is provided with an original sensor configured to output a detection signal having different levels depending on presence or absence of the original D at the original setting part of the ADF 8, and the output of the original sensor is input to the ASIC 41.

<Main Process>

Figure 6:
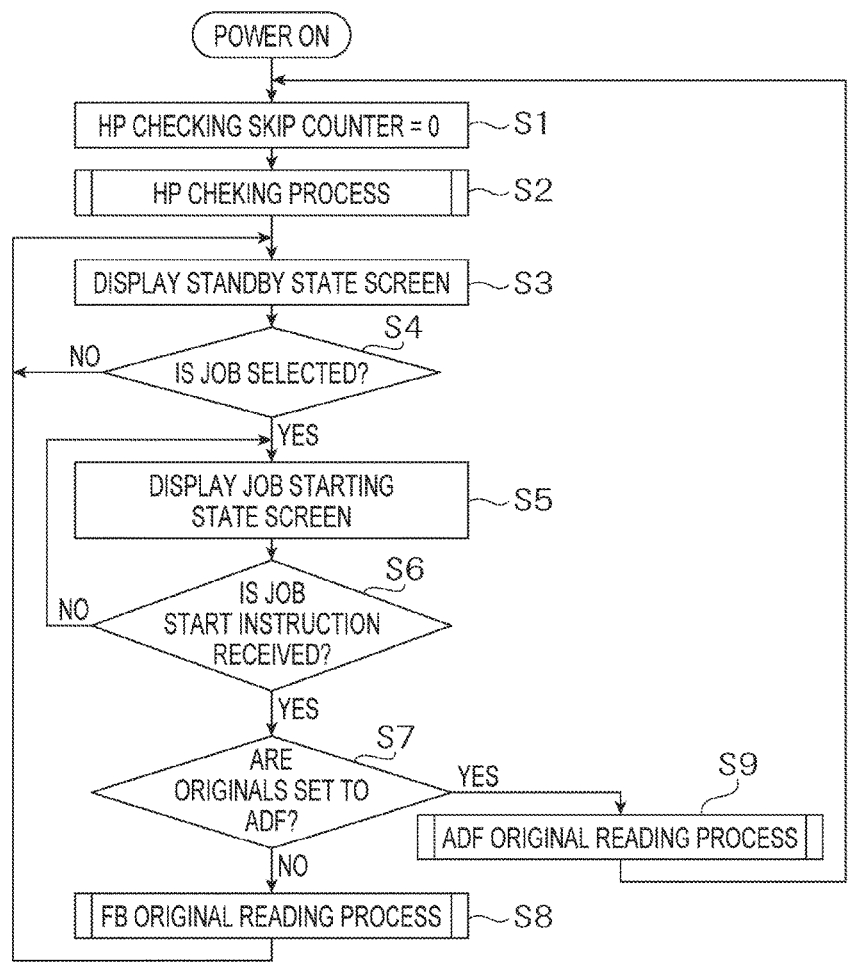
FIG. 6 is a flowchart illustrating a main process of the image reading device.

When the image reading device 3 is powered on, the CPU 44 of the ASIC 41 executes a main process shown in FIG. 6.

In the main process, the CPU 44 resets a value an HP checking skip counter to zero (S1). The HP checking skip counter is a counter used to count the number of times when an HP checking process is skipped and is composed by the RAM 43.

Next, the CPU 44 executes an HP checking process (S2). The HP checking process is a process of checking whether the waiting position WP coincides with the home position HP, details of which will be described later.

Thereafter, the CPU 44 causes the operation panel 46 to display a standby state screen (S3).

Figure 7:
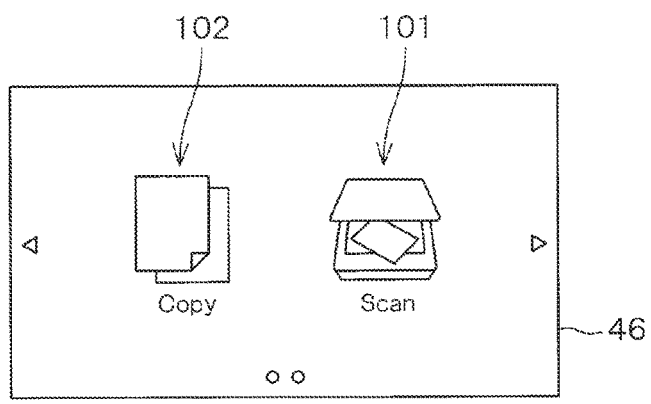
FIG. 7 shows an example of a standby state screen.

FIG. 7 shows an example of the standby state screen. In this example, a scan key 101 and a copy key 102 are displayed in forms of icons arranged in a horizontal direction in FIG. 7. The scan key 101 is a key for selecting a scan job which is a job using the scanning function. The copy key 102 is a key for selecting a copy job which is a job using the copying function. By depressing the scan key 101, selection of the scan job is input to the ASIC 41, and by depressing the copy key 102, selection of the copy job is input to the ASIC 41. It is noted that the scan key 101 and the copy key 102 are the icons displayed on the standby state screen, a single tap or a double tap of the scan key 101 or the copy key 102 may be an operation to select the one of the scan key 101 or the copy key 102. In the following description, such an operation to select one of the scan key 101 or the copy key 102 will be occasionally expressed as "depression" of one of the keys based on an analogy of mechanical keys.

After displaying the standby state screen, the CPU 44 determines whether the scan key 101 or the copy key 102 is depressed (S4). Unless one of the scan key 101 and the copy key 102 is depressed, the main process does not advance to a next step.

When one of the scan job and the copy job is selected (S4: YES), the CPU 44 causes the operation panel 46 to display a job starting state screen (S5). Thus, the screen displayed on the operation panel 46 is switched from the standby state screen to a job starting state screen.

Figure 8:
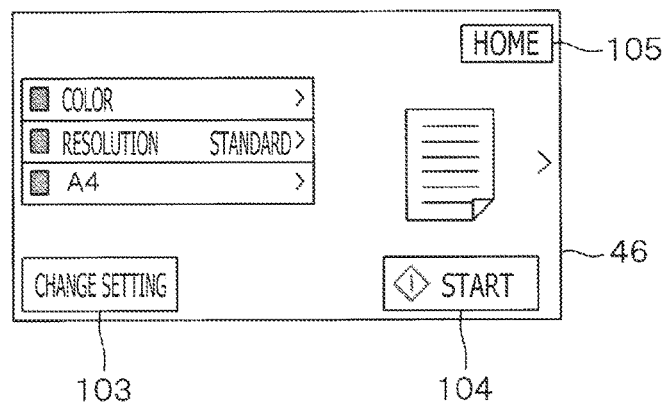
FIG. 8 shows an example of a job starting state screen.

FIG. 8 shows an example of the job starting state screen. In the job starting state screen, setting information regarding a reading operation of the image by the scan job or the copy job is displayed. In the job starting state screen, the setting information regarding a reading mode, a reading resolution and a size of the original is displayed. As the reading mode, one of a color mode which is appropriate for reading a color image, a grayscale mode or a black and white mode which are appropriate for reading a black and white image can be set. As the reading resolution, "low" (e.g., 150 dpi), "standard" (e.g., 300 dpi) and "high" (e.g., 600 dpi) are available according to the present embodiment. As the size of the original, standard original sizes A3 (i.e., 297 mm×420 mm), A4 (i.e., 210 mm×297 mm), A5 (i.e., 148 mm×210 mm), A6 (i.e., 105 mm×148 mm) are available. Alternative, a user-setting size may be set as the size of the original. It is noted that the sizes of the various originals are stored as a standard original size table in the ROM 42. When the original size has been set, the CPU 44 determines the dimensions of the original D in the main scanning direction and the sub scanning direction with referring to the standard original size table stored in the ROM 42. The CPU 44 determines a position spaced rightward from the reading start position PS by the dimension in the sub scanning direction of the original D as the reading end position PE.

In the job staring state screen, for example, a setting change key 103 and a start key 104 may be displayed on a lower end part of thereof with being arranged horizontally as shown in FIG. 8. By depressing a setting change key 103, the job starting state screen as displayed is switched to a screen for changing settings regarding reading of an image. By depressing the start key 104, a job start instruction to start reading the image of the original D (i.e., start of scanning) is input to the ASIC 41. On the job starting state screen, a home key 105 is also displayed. By depressing the home key 105, an instruction to switch the job starting state screen as displayed to a standby sate screen is input to the ASIC 41.

After causing the operation panel 46 to display the job starting state screen, the CPU 44 determines whether the ASIC 41 has received the job start instruction which has been issued as the start key 104 is depressed (S6). It is noted that the main process does not proceed to a next step unless the start key 104 is depressed.

When the CPU 44 has determined that the job start instruction has been input to the ASIC 41 due to depression of the start key 104 (S6: YES), the CPU 44 determines whether the originals D are set at the original setting part of the ADF 8 (S7) based on the detection signal output by the original sensor.

When the CPU 44 determines that no original D is set to the original setting part of the ADF 8 (S7: NO), the CPU 44 executes an FB original reading process shown in FIGS. 9A and 9B (S8).

When the CPU 44 determines that the originals D are set to the original setting part of the ADF 8 (S7: YES), the CPU 44 executes an ADF original reading process shown in FIG. 12 (S9).

<FB Original Reading Process>

Figure 9A:
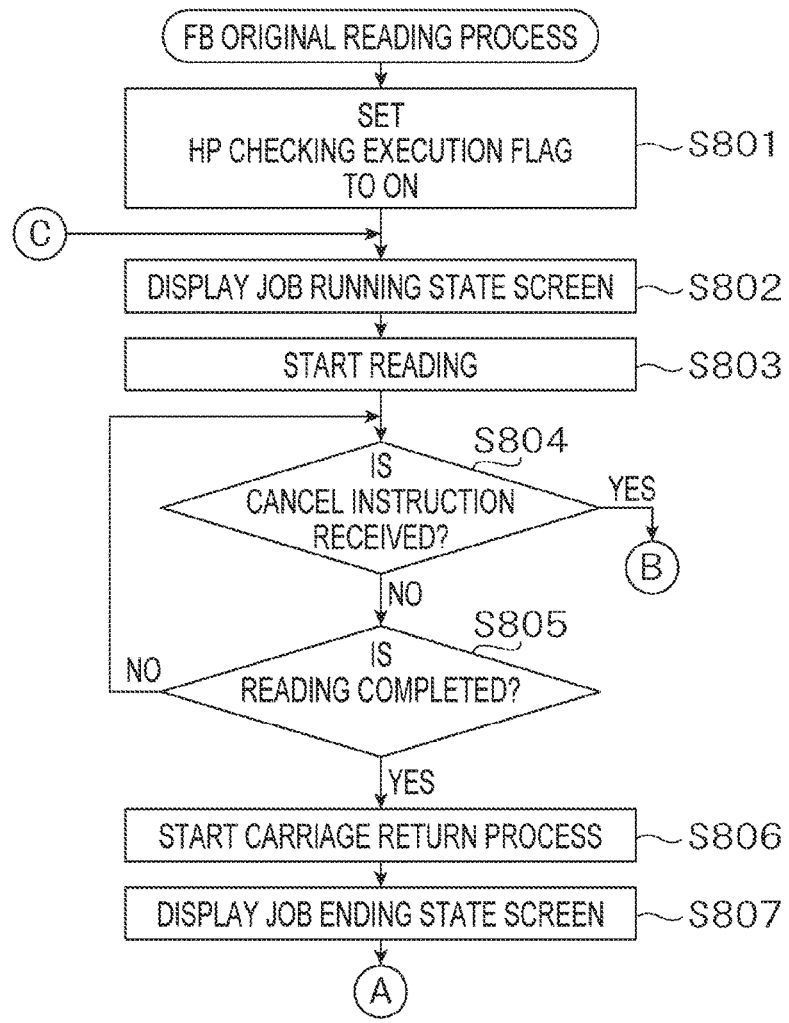
FIGS. 9A and 9B show a flowchart illustrating an FB original reading process.

In the FB original reading process, the CPU 44 sets an HP checking execution flag to ON (FIG. 9A: S801). The HP checking execution flag is stored in the RAM 43 as, for example, 1-bit information indicating ON or OFF. An ON state of the HP checking execution flag indicates that the HP checking process should be executed.

The CPU 44 causes the operation panel 46 to display a job running state screen (S802). Thus, a displayed screen of the operation panel 46 is switched from the job starting state screen to the job running state screen.

When the scan job is being executed, the job running state screen as shown in FIG. 10A is displayed on the operation panel 46. When the scan job is being executed, a job running state screen as shown in FIG. 10B is displayed on the operation panel 46. In the job running state screens, a character string "Scanning" indicating that the scan job is being executed (FIG. 10A) or a character string "Copying" indicating that the copy job is being executed, and a cancel key 106 are displayed. When the cancel key 106 is depressed, an instruction to interrupt (i.e., cancel) the currently executed scan job or copy job is input to the ASIC 41.

After displaying the job running state screen in S802, the CPU 44 starts reading the original D (S803).

As the image reading starts, the CPU 44 controls the motor 26 of the moving mechanism 13 to start moving the reading device 12 located at the waiting position WP in an outward direction. Thereafter, the CPU 44 controls the reading device 12 to start reading the original D. as the motor 26 has rotated by the number of steps necessary to move the reading device 12 to reach the reading end position PE, the CPU 44 stops reading the image, and stores the image data read by the reading device 12 in the RAM 43. Then, the CPU 44 turns off the light 23, and stops moving the reading device 12.

After the reading of the original D was started, the cancel instruction by depression of the cancel key 106 has not been input to the ASIC 41 (S804: NO) and reading of one sheet of the original D has been completed (S805: YES), the CPU 44 controls the motor 26 to start moving the reading device 12 in a homeward position (i.e., carriage-return is started) (S806).

The CPU 44 causes the operation panel 46 to display a job ending state screen (S807). Thus, the displayed screen on the operation panel is switched from the job running state screen to the job ending state screen.

Figure 11A:
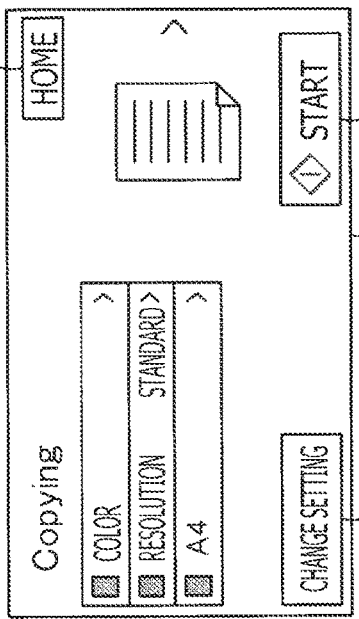
FIGS. 11A-11C show examples of a job ending state screen.

Hereinafter, a first scanning function will be described as the scan job, and a second scanning function will be described as the copy job. When the scan job is being executed, a first job ending state screen shown in FIG. 11A is displayed on the operation panel 46. On the first job ending state screen, the character string "Scanning" indicating that the scanning job is being executed, which was indicated in the job running state screen, is kept displayed. At a central part of the screen, a message asking whether there is a next original D of which data is treated in the same file of the image data of the previously read original D (hereinafter, such an original D will be simply referred to as a next original D) is displayed. An example of such a message is "Is there next original?" as shown in FIG. 11A. Below the message, a YES key 107 and a NO key 108 are arranged in the horizontal direction. When the YES key 107 is depressed, information indicating that there is the next original D is input to the ASIC 41. When the NO key 108 is depressed, information indicating that there is no next original D is input to the ASIC 41. When the YES key 107 is depressed, the CPU 44 switches the displayed screen on the operation panel 46 from the first job ending state screen to a second job ending screen (see FIG. 11C). On the second job ending state screen, a character string "Scanning" indicating that the scan job is being executed is displayed as well as the contents of the job starting state screen (e.g., the setting change key 103, the start key 104 and the home key 105). When the information indicating that there is the next original D, the image subject to the currently executed scan job and the image of the original D which will be scanned next are treated as data of the same file.

Figure 11B:
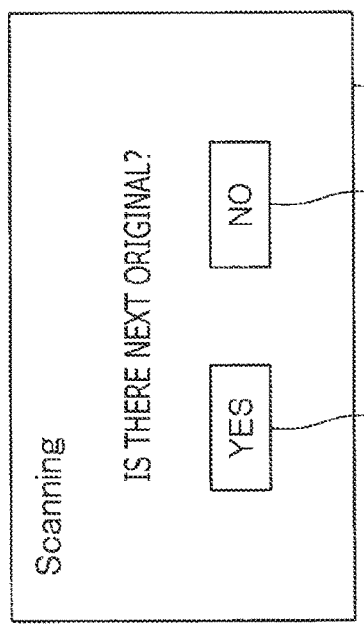
Figure 11C:
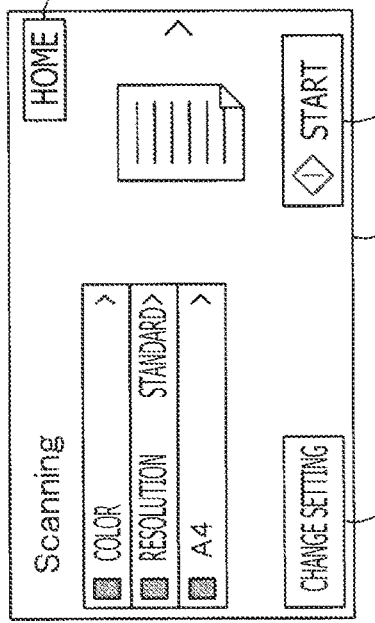

When the copy job is being executed, a job ending state screen shown in FIG. 11B is displayed on the operation panel 46. On the job ending state screen, a character string "Copying" indicating that the copy job is being executed is displayed as well as the contents same as the job starting state screen including the change setting key 103, the start key 104 and the home key 105.

Figure 9B:
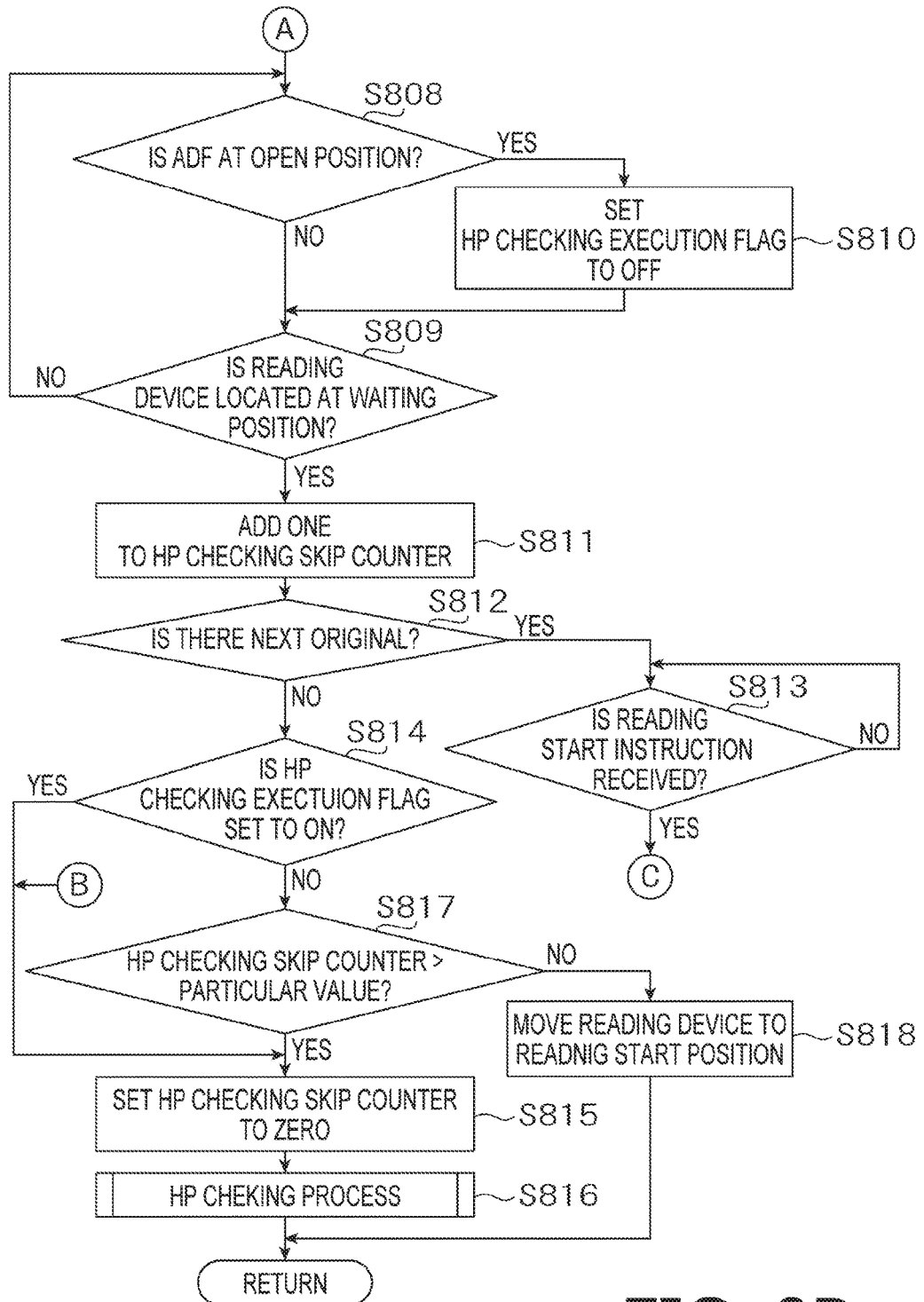

After displaying the job ending state screen, the CPU 44 determines whether the ADF 8 is moved to the opening position (S808) as in FIG. 9B.

Further, the CPU 44 determines whether the reading device 12 moved from the reading end position PE has reached the waiting position WP (S809). In other words, the CPU 44 determines whether the motor 26 has rotated by the number of steps necessary for the reading device 12 is moved from the reading end position PE and reaches the waiting position WP. Until the reading device 12 reaches the waiting position WP, the CPU 44 repeatedly determines whether the ADF 8 is opened.

When the ADF 8 is opened before the reading device 12 reaches the waiting position WP (S808: YES), the CPU 44 sets the HP checking flag to OFF (S810).

When the reading device 12 has moved to the waiting position WP (S809: YES), the CPU 44 increments the value of the HP checking skip counter (S811).

Thereafter, the CPU 44 determines whether information indicating that there is a next original D is input to the ASIC 41 from the operation panel 46. That is, the CPU 44 determines whether the YES key 107 on the first job ending state screen displayed on the operation panel 46 has been depressed during execution of the scan job (S812).

When the CPU 44 determines that the YES key 107 of the first ending state screen has been depressed (S812: YES), the second job ending state screen shown in FIG. 11A is being displayed on the operation panel 46. The CPU 44 determines whether an instruction to start reading is input to the ASIC 41 as the start key 104 displayed on the second job ending state screen is depressed (S813).

When the instruction to start reading is input to the ASIC 41 through the operation panel 46 (S813: YES), control returns to S802 shown in FIG. 9A, and the CPU 44 causes the operation panel 46 to display the job running state screen (S802). Thereafter, the CPU 44 executes a process S803. In this case, the plurality of originals D is read continuously. The CPU 44 aggregates the plurality of pieces of image data of the originals D into one file, and stores the file in the RAM 43.

A case where the information indicating that there exists the next original D is not input to the ASIC 41 (S812: NO) is a case where the NO key 108 is depressed on the first job ending state screen displayed on the operation panel 46 during execution of the scan job, or a case where the job ending state screen as shown in FIG. 11B is displayed on the operation panel 46 during execution of the copy job. In such a case, the CPU 44 treats the image data of a single original D as one file, and stores the file in the RAM 43.

It is noted that, in the scan job, the file stored in the RAM 43 may be transmitted to an external device such as the PC on a file basis, or a plurality of files may be transmitted to external device all together. In the copy job, the file stored in the RAM 43 may be transmitted from the image reading device 3 to the image forming device 2 on a file basis. In the image forming device 2, image represented by the image data included in the file received from the image reading device 3 is formed on a sheet.

When the information indicating that the there exists a next original data D is not input to the ASIC 41 (S812: NO), the CPU 44 determines whether the HP checking execution flag is ON (S814).

When the cancel instruction is input to the ASIC 41 as the cancel key 106 is depressed after reading of the original D was started (S804: YES), the CPU 44 resets the HP checking skip counter to zero (S815), executes the HP checking process (S816), and finishes the FB original reading process.

When the HP checking execution flag is OFF (S814: NO), that is, when the ADF 8 is not moved from the closing position to the opening position while the reading device 12 returns from the reading end position PE to the waiting position WP, the CPU 44 determines whether the value of the HP checking skip counter exceeds a particular value (S817).

When the value of the HP checking skip counter is equal to or less than the particular value (S817: NO), the CPU 44 causes the reading device 12 to move to the reading start position PS (S818), and finishes the FB original reading process.

When the value of the HP checking skip counter exceeds the particular value (S817: YES), the CPU 44 resets the HP checking skip counter to zero (S815), executes the HP checking process (S816), and terminates the FB original reading process.

After the FB original reading process is finished, the CPU 44 returns to the main process shown in FIG. 6, and causes the operation panel 46 to display the standby state screen (S3). After displaying the standby state screen, the CPU 44 executes the process of S4 onwards again.

<ADF Original Reading Process>

Figure 12:
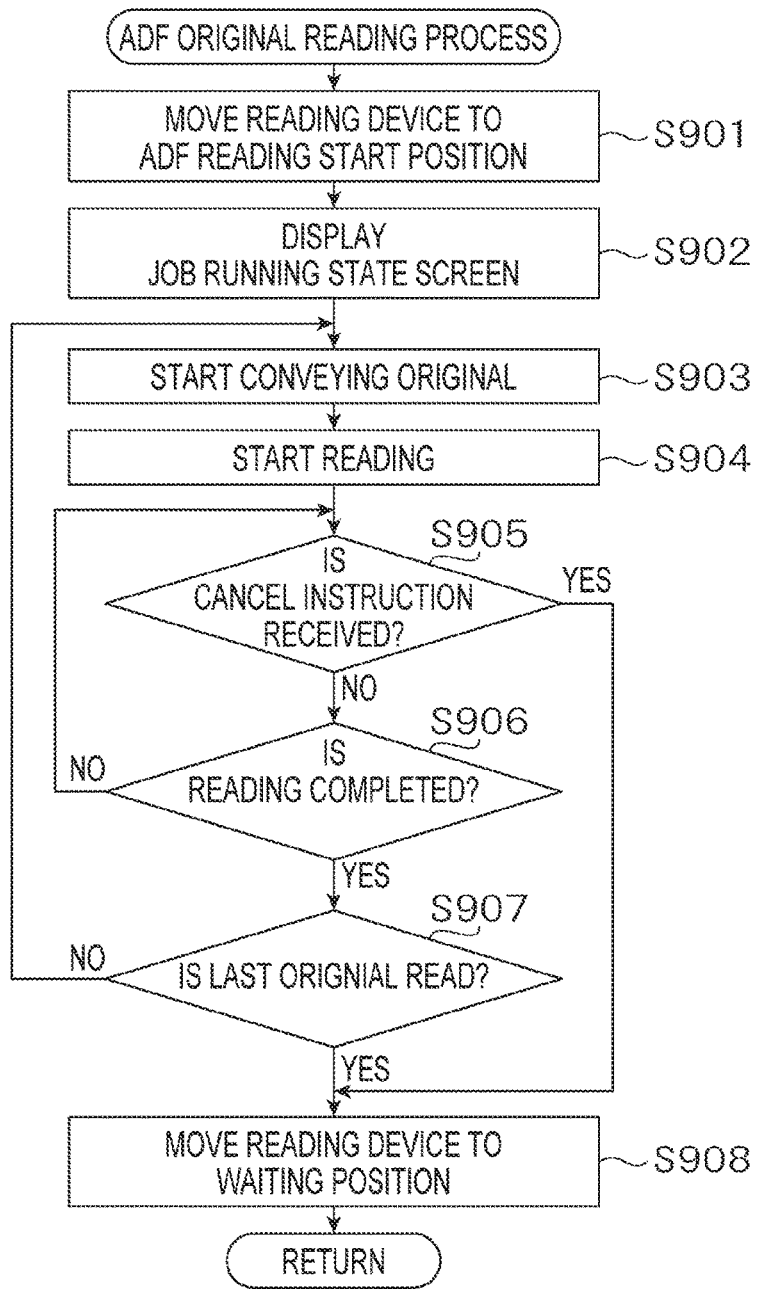
FIG. 12 is a flowchart illustrating an ADF original reading process.
Figure 13:
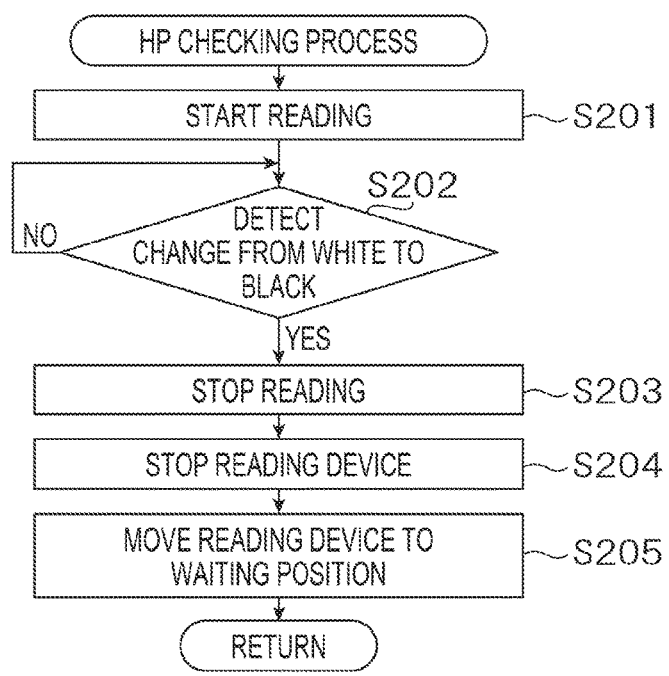
FIG. 13 is a flowchart illustrating an HP checking process.

In the ADF original reading process shown in FIG. 12, the CPU 44 controls the moto 26 of the moving mechanism 13 to move the reading device 12 stopped at the waiting position WP to the ADF reading position PA (S901).

Further, the CPU 44 causes the operation panel 46 to display the job running state screen (S902). Accordingly, the display screen on the operation panel 46 is switched from the job starting state screen to the job running state screen. Regarding the job running state screen, one shown in FIG. 10A is displayed on the operation panel 46 when the scan job is being executed as mentioned above. When the cop job is being executed, the job running state screen shown in FIG. 20B is displayed on the operation panel 46.

Thereafter, the CPU 44 controls the ADF conveying device to start feeding of the original D by the ADF conveying device 45 (S903).

The CPU 44 controls the reading device 12 to start reading of the original D by the reading device 12.

When the original D is being read, the CPU 44 repeatedly determines whether the cancel instruction is input to the ASIC 41 as the cancel key 106 displayed on the job running state screen is depressed (S905).

When the cancel instruction by depression of the cancel key 106 is not input to the ASIC 41 (S905: NO), and reading of the original D has been finished (S906: YES), the CPU 44 determines whether the original D as read is the last sheet of the original D set to the original setting part of the ADF 8 (S907). When the CPU 44 determines that the original D does not exist on the original setting part of the ADF 8 based on the detection signal output by the original sensor provided to the ADF 8, the CPU 44 determines that the original D as read is the last sheet pf the original D, while, when the CPU 44 determines that the original D still exists on the original setting part of the ADF 8 based on the detection signal output by the original sensor provided to the ADF 8, the CPU 44 determines that the original D as read is not the last sheet of the original D.

When the original D as read is not the last sheet of the original D (S907: NO), the CPU 44 controls the ADF conveying device 45 to start conveying the next sheet of the original D by the ADF conveying device 45 (S903).

When the original D as previously read is the last sheet of the original D, and no sheet of the original D exists on the original setting part of the ADF 8, the CPU 44 controls the motor 26 of the moving mechanism 13 to move the reading device 12 from the ADF reading position PA to the waiting position WP (S908), and finishes the ADF original reading process.

After finishing the ADF original reading process, control returns to the main process shown in FIG. 6, the CPU 44 resets the value of the HP checking skip counter to zero (S1), and executes the HP checking process (S2). Thus, every time when the ADF original reading process is finished, the HP checking process should be executed.

<HP Checking Process>

In the HP checking process executed in S2 of FIGS. 6 and S816 of FIG. 9B, the CPU 44 controls the motor 26 included in the moving mechanism 13 to start reading the image with moving the reading device 12 from the waiting position WP toward the reading start position PS (S201).

As the reading device 12 reads the white area 32 and the black area 33 of the adjustment reference plate 31, and when the CPU 44 recognizes change of the image data thereof from white data to black data, that is, when the CPU 44 recognizes that the output level of the image sensor 25 is reduced from a value corresponding to the white area 32 to a value corresponding to the black area 33 (S202: YES), the CPU 44 finish reading of the image by the reading device 12 (S203).

Further, when the CPU 44 recognizes change from white pixels to black pixels, the CPU 44 controls the motor 26 included in the moving mechanism 13 to stop operating the reading device 12 (S204).

Then, the CPU 44 moves the reading device 12 to a regular waiting position WP by moving the reading device 12 leftward by a particular distance between a boundary of the white area 32 and the black area 33 and the home position HP (S205), and finishes the HP checking process. The number of steps of the motor 26 corresponding to the above particular distance has been stored in the ROM 42 before factory shipment of the image reading device 3.

When a distance from the waiting position WP to a position of the reading device 12 at a time when the CPU 44 detects the change of the white pixel to the black pixel is equal to the particular distance between the boundary of the white area 32 and the black area 33 and the home position HP, it is equivalent to confirm that the waiting position WP coincides with the home position HP. Therefore, it could be said that the HP checking process includes an confirming operation of the waiting position WP. On the other hand, when the distance from the waiting position WP to the position of the reading device 12 at a time when the CPU 44 detects the change of the white pixel to the black pixel is not equal to the particular distance between the boundary of the white area 32 and the black area 33 and the home position HP, it is equivalent to confirm that the waiting position WP does not coincide with the home position HP. Therefore, in this case, resetting of the waiting position is performed so that the waiting position coincides with the home position HP.

<Effects>

As described above, according to the illustrative embodiment, the ADF 8 is configured to openable and closable relative to the contact glass 9. The user can open the ADF 8 relative to the glass 9, place the original D subject to be read on the contact glass 9 so as to be supported thereby. Further, the user can open the ADF 8 and remove the original D from the contact glass 9.

In a state where the original D is placed on and supported by the contact glass 9, the reading device 12 is moved from the reading start position PS to the reading end position PE so that the original D is ready by the reading device 12. After the reading device 12 has read the original D, the reading device is moved from the reading end position PE to a reading start position PS.

In the scan job using the first scan function, reading of the original D by the reading device 12 is repeated until the image data including the plurality of sheets of original D, which are to be treated as one file, is obtained, without executing the HP checking process to confirm that the waiting position of the reading device 12 coincides with the home position HP. With the above configuration, a reading process speed can be improved.

When the ADF 8 is opened relative to the contact glass 9 when the reading device 12 is moved, after the previous sheet of the original D has been read, from the reading end position PE to the waiting position WP, it is expected that the user place the next sheet of the original D on the contact glass 9. Therefore, even if the currently executed job is the scan job using the second scan function or the copy job, if the ADF 8 is opened while the reading device is being moved from the reading end position PE to the waiting position WP, the HP checking process will not be executed. According to the above configuration, reading of the next original D can be started quickly.

When the reading device 12 is moved to the waiting position WP without the ADF 8 being opened in the scan job using the second function, the HP checking process is executed and it is confirmed that the waiting position WP coincides with the home position HP.

Since whether the plurality of sheets of original D should be read is determined for each of the first scan function and the second scan function, confirmation of the waiting position WP coinciding with the home position HP (i.e., the HP checking process) can be appropriately executed.

Since whether the plurality of sheets of original D should be read is determined for each of the first scan function and the second scan function, confirmation of the waiting position WP coinciding with the home position HP is appropriately executed, it is unnecessary to obtain a preview image generated by executing a pre-scanning of the original D in order to confirm that the waiting position WP coincides with the home position HP. In other words, according to the illustrative embodiment, confirmation that the waiting position WP coincides with the home position HP can be done without executing the pre-scanning Such a configuration also contributes to improvement of the reading process speed.

With a single process, that is, the FB original reading process, the HP checking process can be appropriately executed as determination whether the plurality of sheets of original D is read continuously for each of the first scan function and the second scan function.

Regardless of whether the scan job using the first scan function or the scan job using the second scan job is executed, when reading of one sheet of original D is completed and the reading device 12 is returned to the waiting position WP, the value of the HP checking skip counter is incremented. The value of the HP checking skip counter is reset to zero when the HP checking process is executed. When the value of the HP checking skip counter exceeds a particular value with the HP checking process being unexecuted, the HP checking process is executed to check whether the waiting position WP coincides with the home position HP even if the ADF 8 is opened to the opening position before returning to the waiting position) WP. With this configuration, a situation where reading of the original D is executed with the waiting position WP being displaced from the home position HP can be suppressed.

Further, after completion of the ADF original reading process, the HP checking process is executed. Therefore, even though the ADF original reading process is executed and many sheets of original D have been continuously read, reading of the original D in the next ADF original reading process with the waiting position WP being displaced from the home position HP can be suppressed.

Further, even when the cancel key 106 is depressed and the cancel instruction is input to the ASIC 41 after reading of original D is started, the HP checking process is executed. When reading of original D is interrupted, since there is a sufficient interval before the reading process of the next original D is started, the HP checking process is executed. By executing the HP checking process, reading of the original D in the next ADF original reading process with the waiting position WP being displaced from the home position HP can be suppressed.

<Modification>

The illustrative embodiment described above may be modified in various ways without departing from aspects of the present disclosures.

In the illustrative embodiment, the scan job is described as an example of the first scan function, and the copy job is described as an example of the second scan function. Aspects of the disclosures should not be limited to such a configuration. In one modification, for example, the copy job may be regarded as an example of the first function and the scan job may be regarded as an example of the second function. In this modification, the function including a step of displaying a message as shown in FIG. 11A may be defined as the first function, and a function which does not include such a step may be defined as the second function.

In the scan job using the first function, the HP checking process may be executed after the image data of the plurality of numbers originals D treated as one file has been obtained, regardless of the number of occurrences of reading operations of the original D after the HP checking process was lastly executed.

According to the illustrative embodiment, a configuration in which the HP checking process is skipped until the image data of the plurality of numbers originals D treated as one file has been obtained in the scan job using the first scan function is described. It should be noted that aspects of the present disclosures need not be limited to such a configuration. For example, it may be configured that the user can set whether the HP checking process is skipped until the image data of the plurality of numbers originals D treated as one file has been obtained, and the HP checking process is skipped until the image data of the plurality of numbers originals D treated as one file only when the user has set to skip the same.

In the illustrative embodiment, the CPU 44 is configured to executed respective processes. The configuration may be modified such that, for example, the ASIC 41 includes a plurality of CPU's and the plurality of CPU's may co-operate to execute the respective processes.

What is claimed is:

1. An image reading device, comprising:
   an original platen configured to support an original;
   a cover configured to be open and close relative to the original platen;
   a detector configured to detect whether the cover is opened or closed;
   a reader configured to read the original supported on the original platen;
   a moving mechanism configured to move the reader along the original platen;
   an operation part configured to select one of a first scan function and a second scan function, the first scan function being a function of treating image data of a plurality of originals read by the reader as one file, the second scan function being a function of treating image data of one original read by the reader as one file; and
   a controller,
   the controller being configured to execute:
   a first moving process in which the controller controls the moving mechanism to move the reader from a reading start position to a reading end position for the reader reading the original supported on the original platen;
   a second moving process in which the controller controls the moving mechanism to move the reader toward a waiting position opposite to the reading end position with respect to the reading start position after the reader read the original; and
   a determining process in which the controller determines whether the waiting position coincides with a regular position when the reader reaches the waiting position,
   wherein, when the operation part receives an operation to select the first scan function, the controller repeatedly executes the first moving process and the second moving process without executing the determining process until image data for a plurality of originals treated as one file is obtained, and
   wherein, when the operation part receives an operation to select the second scan function, the controller executes the second moving process after execution of the first moving process, the controller not executing the determining process in response to detection of opening of the cover by the detector before the reader reaches the waiting position, the controller executing the determining process when opening of the cover is not detected by the detector before the reader reaches the waiting position.

2. The image reading device according to claim 1, when the operation part receives an operation to select the first scan function and after the image data for a plurality of originals treated as one file is obtained:
   the controller does not execute the determining process in response to detection of opening of the cover by the detector before the reader reaches the waiting position; and
   the controller executes the determining process when opening of the cover is not detected by the detector before the reader reaches the waiting position.

3. The image reading device according to claim 1, wherein the controller is configured to:
   receive an input operation to select one of first input information indicating a next original subject to reading is available and second input information indicating a next original subject is not available after a reading process is started in response to the operation part receiving an operation to select the first scan function, the reading process including at least a process of reading the original using the reader with executing the first moving process; and
   treat the image data of a plurality of originals including one subject to reading when the reading process is started and one subject to the input operation as one file.

4. The image reading device according to claim 1, wherein the controller is configured to:
   execute a counting process to count a number of occurrences of a reading process after the determining process was lastly executed, the reading process including at least a process of reading the original using the reader with executing the first moving process; and
   execute the determining process in response to the number of occurrences counted by the counting process reaching a particular number even though the detector detects opening of the cover before the reader reaches the waiting position.

5. The image reading device according to claim 4, wherein, when the operation part receives an operation to select the first scan function, the controller counts, in the counting process, the number of originals of which image data is treated as one file as the number of occurrences of the reading process, and
   wherein, after the image data of the plurality of originals treated as one file is obtained, the controller executes the determining process when the number of occurrences counted in the counting process exceeds the particular number and does not execute the determining process when the number of occurrences counted by the counter is equal to or less than the particular number.

6. The image reading device according to claim 1,
wherein, in response to the operation part receiving an operation to select the first scan function, the controller executes the determining process after the image data for a plurality of originals to be treated one file is obtained.

7. The image reading device according to claim 1,
further comprising an original supplier configured to cause a plurality of originals pass over the original platen one by one without opening and closing the cover,
wherein the controller controls the original supplier and the reader to execute a supply and a read process in which the original passing over the original platen is read by the reader, and
wherein the controller executes the determining process after completion of the supply and the read process.

8. The image reading device according to claim 1,
wherein the controller is configured to execute the determining process when a reading process including at least a process of reading the original using the reader with executing the first moving process is interrupted.

9. A method of controlling an image reading device having an original platen supporting an original, a cover configured to be open and close relative to the original platen, a detector configured to detect whether the cover is opened or closed, a reader configured to read the original supported on the original platen, an operation part, includes:
   a receiving step of receiving selection information through the operation part, the selection information indicating a first function is selected or a second function is selected;
   when the receiving step receives the selection information indicating the first function, a reading step and a moving step repeatedly until receiving an input information indicating completion of image data of a plurality of originals read by the reader as one file, the moving step including moving the reader to a reading end position from a reading start position and moving the reader toward a waiting position opposite to the reading end position with respect to the reading start position from the reading end position;
   when the receiving step receives the selection information indicating the second function, the reading step and the moving step; and
   a determining step of determining whether the waiting position coincides with a regular position,
   wherein the determining step does not determine until receiving the input information when the receiving step receives the selection information indicated the first information,
   wherein the determining step does not determine in response to detection of opening of the cover by the detector before the reader reaches the waiting position when the receiving step receives the selection information indicating the second function, and
   wherein the determining step determines when opening of the cover is not detected by the detector before the reader reaches the waiting position.

10. A non-transitory computer readable recording medium for an image reading device having an original platen supporting an original, a cover configured to be open and close relative to the original platen, a detector configured to detect whether the cover is opened or closed, a reader configured to read the original supported on the original platen, an operation part, and a controller,
    wherein the recording medium contains instructions causing, when executed by the controller, the image reading device to execute:
    a receiving process of receiving selection information through the operation part, the selection information indicating a first function is selected or a second function is selected;
    when the receiving process receives the selection information indicating the first function, a reading process and a moving process repeatedly until receiving an input information indicating completion of image data of a plurality of originals read by the reader as one file, the moving process including moving the reader to a reading end position from a reading start position and moving the reader toward a waiting position opposite to the reading end position with respect to the reading start position from the reading end position;
    when the receiving process receives the selection information indicating the second function, the reading process and the moving process; and
    a determining process of determining whether the waiting position coincides with a regular position,
    wherein the determining process does not determine until receiving the input information when the receiving process receives the selection information indicated the first information,
    wherein the determining process does not determine in response to detection of opening of the cover by the detector before the reader reaches the waiting position when the receiving process receives the selection information indicating the second function, and
    wherein the determining process determines when opening of the cover is not detected by the detector before the reader reaches the waiting position.

* * * * *